US006355731B1

(12) United States Patent
Govoni et al.

(10) Patent No.: US 6,355,731 B1
(45) Date of Patent: Mar. 12, 2002

(54) PROCESS FOR THE PRODUCTION OF HETEROPHASIC POLYMER COMPOSITIONS, AND COMPOSITIONS THUS OBTAINED

(75) Inventors: Gabriele Govoni; Massimo Covezzi, both of Ferrara (IT); Jean News, Bear, DE (US)

(73) Assignee: Montech USA Inc., Wilmington, DE (US)

( * ) Notice: Subject to any disclaimer, the term of this patent is extended or adjusted under 35 U.S.C. 154(b) by 0 days.

(21) Appl. No.: 09/509,659

(22) PCT Filed: Aug. 3, 1999

(86) PCT No.: PCT/EP99/05624

§ 371 Date: Mar. 30, 2000

§ 102(e) Date: Mar. 30, 2000

(87) PCT Pub. No.: WO00/11057

PCT Pub. Date: Mar. 2, 2000

(30) Foreign Application Priority Data

Aug. 19, 1998  (IT) .......................... MI98A1906

(51) Int. Cl.$^7$ ........................ C08F 297/08; C08F 10/02; C08F 10/06; C08F 2/00; C08L 23/10
(52) U.S. Cl. ........................ 525/191; 525/232; 525/240
(58) Field of Search ................. 525/191, 232, 525/240

(56) References Cited

U.S. PATENT DOCUMENTS

| 5,455,300 A | | 10/1995 | Smith | |
| 5,773,515 A | * | 6/1998 | Srinivasan et al. | ......... 525/240 |
| 6,048,942 A | * | 4/2000 | Buchler et al. | ............. 525/240 |

FOREIGN PATENT DOCUMENTS

| EP | 0400333 | 4/1990 |
| EP | 0416379 | 8/1990 |
| EP | 0472946 | 8/1991 |
| EP | 0763553 | 2/1996 |
| WO | 9611218 | 10/1995 |

* cited by examiner

*Primary Examiner*—Nathan M. Nutter

(57) ABSTRACT

A process for the preparation of heterophasic polyolefin compositions by (i) polymerizing to form (a) a crystalline propylene or ethylene polymer, and (b) an elastomeric copolymer of ethylene and a $C_3$–$C_{10}$ α-olefin, wherein the polymerizations are carried out in the presence of a Ziegler-Natta catalyst, (ii) contacting the polymer obtained in (i) with: (a) a compound capable of deactivating the catalyst present in (i), and (b) a catalyst (2) obtained by contacting (I) a compound containing a transition metal M, and at least one ligand coordinated with the metal M by a π bond, and (II) a cocatalyst, and (iii) copolymerizing ethylene and a $C_3$–$C_{10}$ α-olefin in the presence of the polymer treated as in (ii), and the catalyst (2).

8 Claims, No Drawings

PROCESS FOR THE PRODUCTION OF HETEROPHASIC POLYMER COMPOSITIONS, AND COMPOSITIONS THUS OBTAINED

This application is a 35 U.S.C. 371 application of PCT/EP99/05624 filed on Aug. 19, 1998.

This invention concerns a process for the preparation of a thermoplastic elastomeric polyolefin composition through the polymerization of $CH_2$=CHR olefins, where R is selected from H and an alkyl radical with 1–8 carbon atoms. More precisely, this invention concerns a process for the sequential polymerization of the olefins carried out in the presence of catalysts belonging to different classes in the various stages. Moreover, this invention concerns the polymer compositions obtainable with said polymerization process.

Sequential polymerization processes for the preparation of heterophasic polyolefin compositions with both thermoplastic and elastomeric properties are already know. One such a process for the production of the above mentioned compositions is described, as a way of example, in patent application EP-A-400333. Said compositions, which contain a crystalline polyolefin fraction and an elastomeric polyolefin fraction, are produced by way of polymerization in the presence of Ziegler-Natta catalysts.

Also known are processes for the sequential polymerization of olefins carried out in at least two polymerization stages, where the first polymerization occurs with a Ziegler-Natta catalyst, and the second polymerization, started after the deactivation of the Ziegler-Natta catalyst, occurs with a metallocenic catalyst. One such a process is described, as a way of example, in international patent application WO 96/11218. The process described leads to the production of a polymer composition comprising a crystalline polyolefin fraction and an elastomeric polyolefin fraction.

Also know are processed for the sequential polymerization of olefins carried out in at least two polymerization stages, where the first polymerization uses a Ziegler-Natta catalyst, and the second polymerization, started after the deactivation of the Ziegler-Natta catalyst, uses a metallocene catalyst. One such process is described, for example, in international patent application WO 96/11218. The process described produces a polymer composition comprising a cystalline polyolefin fraction and an elastomeric polyolefin fraction.

A multi-stage sequential polymerization process has now been found where one can produce in distinct and subsequent stages two different fractions of elastomeric polymers; with said process, in fact, the second fraction is produced in the total absence of the catalyst that produces the first elastomeric fraction. In this manner it is possible to obtain heterophasic polyolefin compositions containing, in addition to the crystalline polyolefin fraction two different elastomeric polyolefin fractions, one produced solely with Ziegler-Natta catalysts, and the other only with catalysts containing a π bond, such as metallocenic catalysts.

Moreover, thanks to the process of this invention the heterophasic composition is free of undesired effects that are inevitably present when the deactivation of the Ziegler-Natta catalysts stage is not carried out.

Therefore, this invention provides a process for the preparation of a heterophasic polyolefin composition comprising:
i) polymerizing, in any given order,
  a) monomers selected from the group consisting of:
    (1) propylene, whereby a crystalline propylene polymer that is at least 80% by weight insoluble in xylene at ambient temperature is formed,
    (2) propylene and ethylene,
    (3) propylene and a $C_4$–$C_{10}$ α-olefin,
    (4) propylene, ethylene and a $C_4$–$C_{10}$ α-olefin, whereby a crystalline propylene copolymer containing more than 85% by weight of propylene is formed,
    (5) ethylene, whereby an ethylene homopolymer is formed, and
    (6) ethylene and a $C_3$–$C_{12}$ α-olefin, whereby an ethylene copolymer containing up to 20% by mole of the $C_3$–$C_{12}$ α-olefin is formed, and
  b) copolymerizing ethylene and a $C_3$–$C_{10}$ α-olefin, and, optionally, a diene, to form an elastomeric copolymer partially soluble in xylene at ambient temperature, containing up to 70% by weight of ethylene in the fraction soluble in xylene at ambient temperature, wherein the polymerizations are carried out in the presence of a Ziegler-Natta catalyst (1) obtained by contacting the following components:
    (a) a catalytic component containing a titanium compound and an electron-donor compound, both supported on Mg chloride;
    (b) an organometallic compound, and, optionally,
    (c) an electron-donor compound;
ii) contacting the polymer obtained in (i), in any given sequence, with:
  a) a compound capable of deactivating the catalyst present in (i); and
  b) a catalyst (2) obtained by contacting:
    (I) a compound containing a transition metal M, and at least one ligand coordinated with metal M by a π bond, and
    (II) at least one cocatalyst; and
iii) copolymerizing ethylene and a $C_3$–$C_{10}$ α-olefin in the presence of the polymer treated as in (ii), and the catalyst (2).

For the purpose of this patent application by ambient temperature is intended a temperature of about 25° C.

The solubility in xylene is determined according to the method indicated below.

The quantity of ethylene fed during the copolymerization stage (iii) is such that the percentage by weight of ethylene with respect to the total monomers in the copolymer produced in this manner varies preferably from 30 to 80%, more preferably from 50 to 75%. A preferred process of this invention is the one where 20 to 45% by weight of the polymer matrix (1) is produced in stage (i).

An especially preferred process of this invention is the one where in stage (i) (b) an elastomeric copolymer is produced whose fraction soluble in xylene contains up to 40% by weight of ethylene. Moreover, the preferred process of this invention is the one where in stage (i) (b) the fraction of copolymer insoluble in xylene at ambient temperature is from 1 to 15wt% with respect to the whole polymer produced in stage (i).

The polymers produced in stage (i) of the process of this invention are prepared in two or more polymerization phases using, from the above mentioned known Ziegler-Natta catalysts, those that are extremely stereospecific. Examples of said catalysts are described in European patent EP 45 977, and in U.S. patents 4,339,054, 4,472,524, and 4,473,660.

The solid catalyst components used in these catalysts comprise, as electron-donor compounds, the ones selected from ethers, ketones, lactones, compounds containing N, P, and/or S atoms, and mono- and dicarboxylic ester acids.

Particularly suitable are the phthalic acid esters, such as diisobutyl-, dioctyl-, diphenyl phthalate, and benzylbutyl phthalate.

Other particularly suited electron-donors are the 1,3-diethers of formula

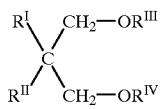

where $R^I$ and $R^{II}$, equal or different from each other, are alkyl, cycloalkyl, or aryl radicals with 1–18 carbon atoms; $R^{III}$ or $R^{IV}$, equal or different from each other, are alkyl radicals with 1–4 carbon atoms, or 1,3-dieters where the carbon atom in position 2 has a cyclic or polycyclic structure containing 5, 6, or 7 carbon atoms, and two or three unsaturations. Ethers with such a structure are described in published European patent applications EP-A-361493, and 728769. Examples representative of said compounds are: 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, and 9,9-bis(methoxymethyl)fluorene.

The preparation of the above mentioned catalyst components is carried out in various methods. For example, a $MgCl_2 \cdot nROH$ adduct (particularly in the form of spherical particles) where n generally ranges from 1 to 3, and ROH is ethanol, butanol, isobutanol, is caused to react with an excess of $TiCl_4$ containing the electron-donor compound. The reaction temperature generally ranges from 80 to 130° C. The solid is then isolated and made to react one more time with $TiCl_4$, optionally in the presence of the electron-donor compound, and is then separated and washed with a hydrocarbon until all the chlorine ions have disappeared.

The titanium compound, expressed as Ti, in the solid catalyst component is generally present in a percentage ranging from 0.5 to 10% by weight; the quantity of electron-donor compound that remains fixed on the solid component (internal donor) generally ranges from 5 to 20% in moles with respect to the magnesium dihalide.

The titanium compounds that can be used for the preparation of the solid catalyst components are the halides and the halogen alcoholates. The preferred compound is titanium tetrachloride.

The method for the preparation of the solid catalyst component mentioned above leads to the formation of magnesium chloride in active form.

Moreover, other reactions that lead to the formation of magnesium chloride in active form starting from magnesium compounds other than the halides, such as magnesium carboxylates, are well known in the literature.

The active form of magnesium chloride of the solid catalyst components can be recognized by the fact that in the X-ray spectrum of the solid catalyst component the major intensity reflection that appears in the spectrum of the nonactivated magnesium chloride (with a surface area lower than 3 m²/g) is no longer present, while in its place there is a halo with the maximum intensity moved over with respect to the position of the major intensity reflection of the nonactivated magnesium chloride, or by the fact that the major intensity reflection presents a half-height width at least 30% greater that the major intensity reflection that appears in the spectrum of the nonactivated magnesium chloride. The most active forms are those where the halo appears in the X-ray spectrum of the component.

The Al-alkyl compounds that can be used as cocatalysts comprise the Al-trialkyls, such as Al-triethyl, Al-triisobutyl, Al-tributyl, and linear or cyclic Al-alkyls containing two or more Al atoms bonded between them by 0 or N atoms, or by $SO_4$ and $SO_3$ groups.

The Al-alkyl compound is generally used in such quantities to cause the Al/Ti ratio to range from 1 to 1000.

The catalyst can be pre-contacted with small quantities of olefin (prepolymerization), maintaining the catalyst in suspension in a hydrocarbon solvent, and carrying out the polymerization at a temperature ranging from ambient temperature and 60° C., thus producing a quantity of polymer equal to 0.5–3 times the weight of the catalyst.

The electron-donor compounds that can be used as external donors, (i.e., added to the Al-alkyl compounds) include the aromatic ester acids, such as alkyl benzoates, and in particular, the silicon compounds containing at least one Si-OR bond (where R is a hydrocarbon radical), 2,2,6,6-tetramethylpiperidine, and 2,6-diisopropylpiperidine.

Examples of silicon compounds are the (tert-butyl)$_2$Si(OCH$_3$)$_2$, the (cyclohexyl)$_2$Si(OCH$_3$)$_2$, the (cyclohexyl)(methyl)Si(OCH$_3$)$_2$, the (cyclopentyl)$_2$Si(OCH$_3$)$_2$, and the (phenyl)$_2$Si(OCH$_3$)$_2$.

The 1,3 diethers having the formulas described above can also be used advantageously. The external donor can be omitted if the internal donor is one of said diethers.

Particularly suitable for the process of this invention are the Ziegler-Natta catalysts with a narrow particle size distribution. Examples of said Ziegler-Natta catalysts and the polymerization processes that can be used are described in published European patent application EP-A-395083.

The treatment stage (ii) is preferably carried out by first executing phase (a) and then phase (b). In the case where phase (b) is carried out first followed by phase (a), it is best to deactivate the Ziegler-Natta catalyst (1) using water.

The compounds suitable for use in stage (ii) (a) can be selected, for example from the compounds having the general formula $R_{y-1}XH$, where R is hydrogen or a hydrocarbon group with 1–10 carbon atoms, X is selected from O, N, or S atoms, and y is the valence of X. Non limiting examples of said compounds are the alcohols, thiols, mono- and di-alkylamine, $NH_3$, water, and $H_2S$. The preferred compounds are those where X is an O atom, and the one particularly preferred among them is water. Other examples of compounds that can be used as deactivators are CO, COS, $CS_2$, $CO_2$, $O_2$, as well as acetylene or allene compounds.

The molar ratio between the deactivating compound and the transition metal compound to be deactivated should be such to assure the actual deactivation of the catalyst used in stage (i). The value of said ratio is preferably greater than 50, more preferably greater than 150, in particular greater than 250.

The catalyst (2) used in stages (ii) and (iii) is obtained by contacting a compound (I) containing at least one L ligand, having a mono- or polycyclic structure containing conjugated π electrons, coordinated with the M metal. The M metal is generally selected from the groups IVB, VB, and VIB of the periodic table of the elements, preferably from Ti, Zr, V, and Hf.

Said compounds (I) and the compounds used as cocatalysts, such as the methylalumoxanes, are well known in the art.

The compounds (I) can be generally represented by the formula

where Cp is a cyclopentadienyl ring that can be part of a polycyclic structure, such as indenyl or fluorenyl; x is 1, 2, or 3; M is the above mentioned transition metal; A and B, equal or different, are selected from hydrogen, halogens, and alkyl groups, optionally containing heteroatoms, such as O, N, and S; y and z are zero or integers, greater than zero, with the proviso that the sum of x, y, and z correspond to the oxidation number of M.

Preferably, at least one of the cyclopentadienyl Cp rings carries at least one substituent such as alkyl and aryl radicals, in particular an alkyl substituent, such as $C_1$–$C_5$ alkyl radicals. Moreover, the cyclopentadienyl rings can be connected between them by way of bivalent groups, for example alkylene (polymethylene) or dialkylsilane groups. Specific examples are the derivatives of bis (cyclopentadienyl) zirconium dichloride having variously substituted cyclopentadienyl rings.

Some of said compounds are described, for example, in the above mentioned international patent application WO 96/11218. Examples of compounds (I) that can be used for the purpose of this invention are: $(Me_5Cp)MMe_3$, $(Me_5Cp)M(OMe)_3$, $(Me_5Cp)MCl_3$, $CpMCl_3$, $CpMMe_3$, $(MeCp)MMe_3$, $(Me_3Cp)MMe_3$, $(Me_4Cp)MCl_3$, $CpMBu_3$, $(Me_5Cp)_2MCl_2$, $(Ind)MBenz_3$, $(H_4Ind)MBenz_3$, $(Cp)_2MCl_2$, $(Me_3SiCp)_2MCl_2$, $(Cp)_2MMe_2$, $(Cp)_2MEt_2$, $(Cp)_2MPh_2$, $(Cp)_2M(OMe)_2$, $(Cp)_2M(OMe)Cl$, $(MeCp)_2MCl_2$, $(Me_5Cp)_2MMe_2$, $(Me_5Cp)_2MMeCl$, $(Cp)(Me_5Cp)MCl_2$, $(1$-$MeFlu)_2MCl_2$, $(BuCp)_2MCl_2$, $(Me_3Cp)_2MCl_2$, $(Me_4Cp)_2MCl_2$, $(Me_4Cp)_2M(OMe)_2$, $(Me_3Cp)_2MCl_2$, $(Me_5Cp)_2M(OH)Cl$, $(Me_5Cp)_2M(OH)_2$, $(Me_5Cp)_2M(Ph)_2$, $(Me_5Cp)_2M(Me)Cl$, $(EtMe_4Cp)_2MCl_2$, $[(Ph)Me_4Cp]_2MCl_2$, $(Et_5Cp)_2MCl_2$, $(Me_5Cp)_2M(Ph)Cl$, $(Ind)_2MCl_2$, $(Ind)_2MMe_2$, $(H_4Ind)MCl_2$, $(H_4Ind)MMe_2$, $[(Me_3Si)_2Cp]_2MCl_2$, $(Me_4Cp)(Me_5Cp)MCl_2$, $C_2H_4(Ind)_2MCl_2$, $C_2H_4(Ind)_2MMe$, $C_2H_4(H_4Ind)_2MCl_2$, $C_2H_4(H_4Ind)_2MMe_2$. $Me_2Si(Me_4Cp)_2MCl_2$, $Me_2Si(Me_4Cp)_2MMe_2$, $Me_2SiCp_2MCl_2$, $Me_2SiCp_2MMe_2$, $Me_2Si(Me_4Cp)_2M(OMe)Me$, $Me_2Si(Flu)_2MCl_2$, $Me_2Si(2$-$Et$-$5$-$iPrCp)_2MCl_2$, $Me_2Si(H_4Ind)_2MCl_2$, $Me_2Si(H_4Flu)_2MCl_2$, $Me_2SiCH_2(Ind)_2MCl_2$, $Me_2Si(2$-$MeInd)_2MCl_2$, $Me_2Si(2Me$-$5$-$Et$-$Cp)_2$, $MCl_2$, $Me_2Si(2$-$Me$-$Cp)_2MCl_2$, $Me_2Si(2$-$Me$-$4,5$-$benzoindenyl)_2MCl_2$, $Me_2Si(4,5$-$benzoindenyl)_2MCl_2$, $Me_2Si(EtInd)_2MCl_2$. $Me_2Si(2$-$iPr$-$Ind)_2MCl_2$, $Me_2Si(2$-$tert$-$butyl$-$Ind)_2MCl_2$, $Me_2Si(3$-$tert$-$butyl$-$5$-$Me$-$Cp)_2MCl_2$, $Me_2Si(3$-$tert$-$butyl$-$5$-$Me$-$Cp)_2MMe_2$, $C_2H_4(2$-$Me$-$4,5$-$benzolnd)_2MCl_2$, $Me_2C(Flu)CpMCl_2$, $Ph_2Si(Ind)_2MCl_2$, $Ph(Me)Si(Ind)_2MCl_2$, $C_2H_4(H_4Ind)M(NMe_2)OMe$, isopropylidene -(3-tert-butyl-Cp)(Flu)$MCl_2$, $Me_2C(Me_4Cp)(MeCp)MCl_2$, $Me_2Si(Ind)_2MCl_2$, $Me_2Si(Me_4Cp)_2M(OEt)Cl$, $C_2H_4(Ind)_2M(NMe_2)_2$, $C_2H_4(Me_4Cp)_2MCl_2$, $Me_2Si(3$-$Me$-$Ind)_2MCl_2$, $C_2H_4(2$-$Me$-$Ind)_2MCl_2$, $C_2H_4(3$-$Me$-$Ind)_2MCl_2$, $C_2Me_4(Ind)_2MCl_2$, $Ind)_2MCl_2$, $C_2H_4(5,6$-$dimethyl$-$Ind)_2MCl_2$, $C_2H_4(3,4,7$-$trimethyl$-$Ind)_2MCl_2$, $C_2H_4(2$-$methyl$-$H_4Ind)_2MCl_2$, $C_2H_4(4,7$-$dimethyl$-$H_4Ind)_2MCl_2$, $C_2H_4(2,4,7$-$trimethyl$-$H_4Ind)_2MCl_2$, $Me_2$, $Si(4,7$-$dimethyl$-$Ind)_2MCl_2$, $Me_2Si(5,6$-$dimethyl$-$Ind)_2MCl_2$, and $Me_2Si(2,4,7$-$trimethyl$-$H_4Ind)_2MCl_2$.

The symbols in the above mentioned formulas have the following meaning: Me=methyl. Et=ethyl, iPr=isopropyl, Bu=butyl, Ph=phenyl. Cp=cyclopentadienyl, Ind=indenyl, $H_4Ind$=4,5,6,7-tetrahydroindenyl, Benz=benzyl, Flu=fluorenyl, M=Ti, Zr, or Hf, preferably Zr.

The alumoxanes forming the cocatalyst (II) comprise the linear oligomeric compounds of formula:

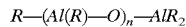

or cyclic compounds of formula:

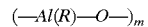

where n varies, for example, from 1 to 40, m from 3 to 40, and R is an alkyl group containing preferably from 1 to 8 carbon atoms. A specific example of said compounds is the methylalumoxane.

As an alternative to the alumoxanes one can use, as cocatalysts, compounds capable of forming a metallocene alkyl cation. Examples of said compounds are the compounds of formula $Y^+Z^-$, where $Y^+$ is a Brønsted acid capable of donating a protone and react irreversibly with an A or B substituent of the metallocenic compound, and Z– is a compatible anion that does not coordinate, and is capable of stabilizing the active catalyst that originates from the reaction of the two compounds, and is sufficiently labile that it can be moved by an olefinic substrate. Preferably the $Z^-$ anion comprises one or more boron ions, more preferably it is an anion of formula $BAr_4^-$, where the Ar substituents, equal or different, are alkyl radicals, such as phenyl, pentafluorophenyl, bis(trifluoromethyl)phenyl. Particularly preferred is the tetrakis-pentafluorophenyl-borate. Moreover, one can also suitably use the compounds of formula $BAr_3$, where B is boron, and the Ar substituents, equal or different, have the above mentioned meaning.

The deactivation treatment of stage (ii), where the polymer from stage (i) is caused to come in contact with the above mentioned deactivating agents, can be carried out in various ways, in particular by maintaining the polymer in suspension in a liquid medium (selected, for example, from the hydrocarbon and olefin monomer solvents), or in a gas medium such as nitrogen, gaseous hydrocarbons or olefin monomers), said liquid or gaseous medium contains the deactivating agents. The contact time varies, for example, from 1 minute to several hours. Humidified hexane is an example of a solvent containing the deactivator. At the end of treatment (a) the solvent is removed and the polymer is subjected to treatment (b). Treatment (b) is preferably carried out by using a solution of the transition metal compound (I) in hydrocarbon solvents containing the cocatalyst (II) in dispersed form, an alumoxane, such as polymethylalumoxane (MAO) tetraisobutylalumoxane, or tetra(2,4,4-trimethylpentyl)-alumoxane, and optionally an Al-alkyl compound, such as triisobityl-aluminum and Al-triethyl. The molar ratio between the cocatalyst (II) and the transition metal compound (I) is greater than 2, preferably from 5 to 1000.

Treatment (b) can also be carried out by suspending the polymer from treatment (a) in a hydrocarbon solvent containing the catalyst (2), generally operating at temperatures ranging from 0 to 100° C., preferably from 10 to 60° C.

As an alternative, the polymer obtained from treatment (a) can be made to contact with a minimum quantity of hydrocarbon solvent containing the catalyst (2), but sufficient to maintain the catalyst (2) in solution.

The quantity of transition metal compound (I) contained in the product obtained in stage (ii) can vary considerably since it depends on the type of compound (I) used and the relative quantity of polymer one desires to produce in the various stages. Generally speaking, said quantity ranges from $1·10^{-7}$ to $5·10^{-3}$ g of metal M/g of polymer produced in stage (ii), preferably from $5·10^{-7}$ to $5·10^{-4}$, more preferably from $1·10^{-6}$ to $1·10^{-4}$.

Polymerization stage (iii), as well as the preceding stages, can be carried out in liquid or gas phase, operating in one or more reactors, following polymerization methods known in the art.

During stage (iii) it is also possible to feed in the polymerization reactor an aluminum compound selected from the aluminum trialkyls where the alkyl groups have from 1 to 12 carbon atoms, and linear or cyclic alumoxanes containing from 1 to 50 repetitive units of formula —($R_4$)

AlO—, where $R_4$ is an alkyl group with 1–12 carbon atoms, or an aryl or cycloalkyl group with 6–10 carbon atoms. Generally speaking the aluminum trialkyl compound is added in the polymerization reactor when treatment (b) in stage (ii) is carried out in the absence of the Al-alkyl compound.

The $C_4$—$C_{10}$ α-olefins fed to the process of this invention comprise both linear and branched α-olefins. Said α-olefins are preferably selected from: 1-butene, 1-pentene, 1-hexene. 1-octene, and 4-methyl-1-pentene. The preferred α-olefin is 1-butene.

Examples of dienes that can be used in the process of this invention are: 1,4-butadiene, 1,4-hexadiene, 2-methyl-1,4-pentene, 1,5-cyclooctadiene, 1,4-cycloheptadiene, norbornadiene, and ethylidene-norbornene.

As previously stated, this invention also concerns the polymer compositions obtainable from the process of the present invention.

In particular, object of this invention are the heterophasic polymer compositions that present a particular balance of softness, impact strength, and flexibility.

Moreover, although said compositions are very soft, they show a very low blooming effect, certainly lower compared to the elastomeric thermoplastic polyolefin compositions known in the art, even though the latter have a lower content of elastomers.

In terms of optical properties, the light reflection ability is different in the compositions of this invention compared to the elastomeric thermoplastic polyolefins known in the art. In fact, the articles produced with the compositions of the present invention are opaque instead of shiny, and therefore have particularly low gloss values.

Said thermoplastic and elastomeric polymer compositions comprise (weight percentage):

1) 10–45%, preferably 15–40%, more preferably from 15 to 35%, of a crystalline polymer fration selected from a propylene homopolymer with a solubility in xylene at ambient temperature greater than 80%, preferably greater than 90%, a copolymer of propylene with ethylene or a $C_4$–$C_{10}$ α-olefin, or mixtures of said comonomers; said copolymers containing more than 85% of propylene, and having an insolubility in xylene at ambient temperature greater than 80%, or a homopolymer or copolymer of ethylene with a $C_3$–$C_{12}$ α-olefin; said copolymer containing up to 20% in moles of the $C_3$–$C_{12}$ α-olefin;
2) from 16 to 55%, preferably from 16 to 50%, of a fraction partially soluble in xylene at ambient temperature, made up of copolymers of ethylene with a $C_3$–$C_{10}$ α-olefin; said fraction comprising an elastomeric copolymer of ethylene with a $C_3$–$C_{10}$ α-olefin, and optionally minor quantities of a diene, soluble in xylene at ambient temperature, and from 1to 15%, with respect to the sum of said fractions (1) and (2), of a crystalline copolymer of ethylene with a $C_3$–$C_{10}$ α-olefin insoluble in xylene at ambient temperature; said elastomeric copolymer containing up to 40% of ethylene;
3) 15–60, preferably 20–60%, of an elastomeric copolymer selected from copolymers of ethylene with a $C_3$–$C_{10}$ α-olefin containing from 30 to 80%, preferably 50–75%, of ethylene; said copolymer having an Mw/Mn ratio lower than 7;

said polymer compositions having a ratio between the quantity of said fraction soluble in xylene at ambient temperature of copolymer fraction (2) and the quantity of polymer fraction (1) equal to or less than 1.5.

A preferred example of the composition of this invention are those compositions where the quantity of ethylene in the fraction soluble in xylene at ambient temperature of copolymer fraction (2) is less than 38% by weight.

The polymer of fraction (1) is preferably a propylene copolymer with ethylene or a $C_4$–$C_{10}$ α-olefin, or mixtures of both.

The crystalline polymer of ethylene is, for example, an HDPE or an LLDPE.

The $C_4$–$C_{10}$ α-olefins that can be used for the preparation of the polymer compositions of this invention comprise both linear and branched α-olefins. Said α-olefins are preferably selected from: 1-butene, 1-pentene, 1-hexene, 1-octene, and 4-methyl-1-pentene. The particularly preferred α-olefin is the 1-butene.

Examples of dienes that can be used in the process of this invention are: 1,4-butadiene, 1,4-hexadiene, 2-methyl-1,4-pentene, 1,5-cyclooctadiene, 1,4-cycloheptadiene, norbornadiene, and ethylidene-norbornene.

Preferably, the diene that is optionally present in the copolymer of fraction (2) ranges in quantity from 0.5 to 10% by weight with respect to the weight of copolymer fraction (2).

The intrinsic viscosity of the elastomeric copolymer of fraction (2) preferably ranges from 1.5 to 4.5 dl/g.

The elastomeric copolymer (3) is preferably selected from copolymers of ethylene with propylene or 1-butene, preferably containing from 30 to 80%, more preferably from 50 to 75% by weight, of ethylene.

Typically the elastomeric copolymer (3) has intrinsic viscosity values greater than 1.5 dl/g, in particular greater than 2 dl/g, for example from 2.2 to 6 dl/g.

The compositions of this invention have melt flow rate (MFR) values that vary greatly depending on the type of process they are subjected to. The high MFR values can be obtained using known techniques, i.e., directly in polymerization by way of molecular weight regulators (particularly hydrogen), or, following the formation of the polymer, by way of chemical visbreaking with free radical initiators.

As a way of example, the MFR of the composition of this invention, determined with the method described below, can vary from 0.1 to 100 g/10 min.

The compositions of this invention can also contain various additives commonly used in thermoplastic polymer compositions, such as stabilizers, antioxidating agents, anti-corrosion agents, anti-UV agents, carbon black, pigments, plasticizing agents, slip agents, etc.

The compositions of this invention are particularly useful for the preparation of extrusion or injection products, in particular for the preparation of sheets and film, both single layer and multi-layer, where at least one of the layers contains the compositions of the present invention.

The following examples are given in order to illustrate but not limit the present invention.

Tests have been carried out on the polymer and films of the present invention to evaluate their characteristics and properties; the methodology used in carrying out said tests are described below.

Solubility: determined as a percentage of residue soluble in xylene at 25° C. in the following manner: one prepares a solution of the sample in xylene at a concentration of 1% by weight, maintaining the sample in xylene under stirring conditions for one hour at 135° C. Continuing to stir the solution is allowed to cool to 95° C., after which it is poured into a bath kept at 25° C. and left there for 20 minutes without stirring, and for an additional 10 minutes after stirring is resumed. The solution is then filtered, and acetone is added to a portion of the filtrate to obtain the precipitation of the dissolved polymer. The polymer thus obtained is recovered, washed, dried, and finally weighed to determine the percentage of soluble in xylene.

Intrinsic viscosity (I.V.): determined in tetrahydronaphthaline at 135° C.

Melt Flow Rate (MFR): according to ASTM-D 1238, condition L.

Flexural modulus of elasticity: ASTM D-790

Hardness (Shore D): ASTM D-2240

Impact strength (IZOD): ASTM D-256

Gloss: one measures the fraction of luminous flux reflected by the surface of the film used for the test. The light ray has a fixed angle of incidence. The following simplified Fresnel equation, adequate for non-metals, is used:

$$F=\frac{1}{2}[sen^2(i-r)/sen^2(i+r)]+[tg^2(i-r)/tg^2(i+r)]=I/Io$$

where F is the luminous flux fraction, I is the emerging flux, Io is the incidence flux, i is the angle of incidence, r is the angle of refraction, and sen r is (sen i)/n, where n is the index of refraction.

The apparatus used is a Zehnetner ZGM 1020 photometer for a 45°/60° angle of incidence reading.

The gloss value is given as the median value of three readings.

Blooming: one determines the gloss variation of a specimen produced by injection molding using an automatic injection process. The operating conditions are: melt temperature 220° C., molding temperature 40° C., and backpressure 10 bar. The dimensions of the specimens are 175×74×3 mm. The specimen prepared in this manner is placed in an oven at 80° C. for 30 days. The specimen's gloss is measured at the end of this period.

Energy: the biaxial impact strength is measured using a hammer for the impact. The apparatus used for the impact test is a CEAST 6758/000 model n. 2. The specimen having dimensions of 175×74×3 m and prepared by injection is struck by a 5.3 Kg hammer falling from a height of 30 cm.

Examples 1–5 and Comparative Example 1c

General Operating Conditions

During polymerization the gas phase is continuously analyzed by gaschromatography in order to determine the content of ethylene, propylene, hydrogen, and propane. The above mentioned gasses are fed in such a way that during the course of the polymerization their concentration in gas phase remains constant.

Stage (i) (a)

The propylene is prepolymerized in liquid propane in a reactor with an internal temperature of 20–25° C. in the presence of the catalyst and cocatalyst, i.e., Al-triethyl (TEAL), and the appropriate quantities of electron-donor dicyclopentyldimetoxysilane (DCPMS) in the liquid propane.

The catalyst, containing titanium diisobutylphthalate as electron donor, has been prepared according to the process of example 3 described in patent application EP-A-395083.

Stage (i) (b)

The prepolymer of the preceding stage is discharged into a second reactor having a temperature of 60° C. Then one feeds hydrogen, propane, propylene, and ethylene in the desired ratio and quantities to obtain the composition in gas phase.

During the above mentioned polymerization processes, the composition in gas phase in maintained constant by feeding a mixture of propylene, ethylene, propane, and hydrogen using instruments that regulate and/or measure the flow of the monomers.

Stage (ii), phase (a)

In an apparatus one contacts for 5–30 minutes the polymer obtained in stage (i) with a flow of humidified propane.

Stage (ii), phase (b)

The polymer discharged from the apparatus after phase (a) is conveyed to a second apparatus with an atmosphere of nitrogen and propane, where it is made to contact with liquid propane in which one finds dispersed the catalyst meso-ethylene-bis(4,7-dimethyl -1-indenyl)zirconium dichloride (mEBDMIZrCl$_2$), the cocatalyst methylalumoxane (MAO), and triisobutylaluminum (TIBAL). Previously the catalyst and the above mentioned aluminum compounds had been dispersed in liquid propane in an apparatus operating at 20° C.

The polymer is allowed to contact the metallocenic catalyst for about 15 minutes at a temperture of 40° C. The propane is then removed by flashing.

Stage (iii)

The copolymerization is carried out in a reactor operating at 45° C. where one adds to the polymer previously obtained ethylene, propylene, propane, and hydrogen. The copolymerization is carried out operating at a pressure of 12–15 bar for three-six hours.

At the end of the polymerization the polymer particles are subjected to a water vapor treatment, dried at 60° C., and then stabilized.

In the following tables are reported respectively the operating conditions and the quantities of catalysts and cocatalysts used in the composition, as well as the properties of the polymer mixtures.

Example 5 concerns a heterophasic polymer composition that has been produced according to the process of this invention, but whose properties are not optimal because it has a composition different from the one considered normal.

The blooming test shows that the specimen of example 4 displays very little blooming, the specimen of example 1 displays little blooming, while in the specimen of comparative example 1 the blooming is very obvious.

TABLE 1

Stage (i) (a)

| Example | 1 | 2 | 3 |
|---|---|---|---|
| Catalyst (g/h) | 4.5 | 4.5 | 4.5 |
| Cocatalyst (g/h) | 28.9 | 29.2 | 29.2 |
| Electron-donor (g/h) | 7.2 | 7.4 | 7.4 |
| Ethylene content (wt %) | 3.4 | 3.1 | 3.4 |
| Fraction insoluble in xylene (wt %) | 94.2 | 94.2 | 94.2 |
| Fraction soluble in xylene (wt %) | 5.8 | 5.8 | 5.8 |
| Content of ethylene in the fraction insoluble in xylene (wt %) | 2.8 | — | — |
| Content of ethylene in the fraction soluble in xylene (wt %) | 14.5 | — | — |
| Melt flow rate (g/10 min) | 20 | 2.2 | 1.8 |
| I.V. of soluble fraction (dl/g) | 0.38 | — | — |

TABLE 2

Stage (i) (a)

| Example | 4 | 5 | 1c |
|---|---|---|---|
| Catalyst (g/h) | 4.5 | 4.5 | — |
| Cocatalyst (g/h) | 29.2 | 29.2 | — |
| Electron-donor (g/h) | 7.4 | 7.4 | — |
| Ethylene content (wt %) | 3.2 | 3.3 | 3.4 |
| Fraction insoluble in xylene (wt %) | 94.2 | 94.2 | — |
| Fraction soluble in xylene (wt %) | 3.8 | 3.8 | — |

TABLE 2-continued

Stage (i) (a)

| Example | 4 | 5 | 1c |
|---|---|---|---|
| Melt flow rate (g/10 min) | 1.8 | 2.0 | — |
| I.V. of fraction soluble in xylene (dl/g) | — | — | 1.5 |

TABLE 3

Stage (i) (b)

| Example | 1 | 2 | 3 | 4 | 5 | 1c |
|---|---|---|---|---|---|---|
| Ethylene/(ethylene + propylene) (in moles) | 0.19 | 0.15 | 0.15 | 0.15 | 0.15 | 0.15 |
| Hydrogen in gas phase (molar %) | 0.3 | 0.5 | 0.4 | 0.9 | 0.5 | — |
| Fraction soluble in xylene[1] (wt %) | 51.8 | 55.6 | 61.0 | 51.1 | 46.0 | 91 |
| Total ethylene content (wt %) | 17.6 | 15.7 | 15.9 | 15.9 | 15.9 | — |
| Ethylene content in the fraction soluble in xylene (wt %) | 26 | 26 | 26 | 26 | 26 | 26 |
| I.V. of the soluble fraction (dl/g) | 3.73 | 3.71 | 3.7 | 3.29 | 3.56 | 3.2 |

[1] Weight fraction determined with respect to the composition obtained in stages (1) (a) and (b)

TABLE 4

Stages (ii) and (iii)

| Example | 1 | 2 | 3 | 4 | 5 |
|---|---|---|---|---|---|
| Stage (ii) | | | | | |
| Water[1] (g) | 0.9 | 6.5 | 8.7 | 6.5 | 6.5 |
| m-EBDMI (g/h) | 2.2 | 2.0 | 2.0 | 2.0 | 2.0 |
| TIBAL (g/h) | 121 | 168 | 187 | 140 | 126 |
| MAO (g/h) | 13.5 | 16.5 | 16.5 | 14.0 | 14.0 |
| Stage (iii) | | | | | |
| Ethylene/(ethylene + propylene) (molar %) | 0.6 | 0.6 | 0.6 | 0.6 | 0.6 |
| Ethylene[2] weight % | 66.0 | 66.0 | 66.0 | 66.0 | 66.0 |
| I.V.[3] dl/g | 2.4 | — | 1.8 | 1.6 | 4.4 |

[1] The water is fed in molar excess
[2] Percentage of ethylene in the copolymer produced in stage (iii)
[3] Intrinsic viscosity of the fraction soluble in xylene of the copolymer produced in stage (iii).

TABLE 5

| Example | 1 | 2 | 3 |
|---|---|---|---|
| Copolymer (1) wt % | 33 | 32 | 29 |
| Copolymer (2) wt % | 38 | 43 | 40 |
| Copolymer (3) wt % | 29 | 25 | 31 |
| Ratio between the fraction soluble in xylene of copolymer (2) and copolymer (1) | 1.08 | 1.26 | — |
| Total ethylene content wt % | 31.4 | 27.8 | 31.4 |
| Fraction soluble in xylene wt % | 67 | 63.2 | 68.7 |
| Content of ethylene in fraction soluble in xylene w % | 46.6 | 42.5 | 3.06 |
| I.V. of fraction soluble in xylene dl/g | 3.1 | 2.67 | — |
| Melt flow rate (g/10 min) | 0.57 | 0.33 | 0.22 |
| Flexural modulus MPa | 100 | 90 | 73 |
| Izod at –40° C. (J/m) | NB[1] | NB[1] | NB[1] |
| Film gloss % | 5.3 | 15.2 | 14 |

TABLE 5-continued

| Example | 1 | 2 | 3 |
|---|---|---|---|
| Shore D hardness points | 29 | 26 | 25 |
| Energy –50° C. J | 13.6 | 14.3 | 12.8 |

[1] NB = no breakage of the specimen

TABLE 6

| Example | 4 | 5 | 1c |
|---|---|---|---|
| Copolymer (1) wt % | 33 | 43 | 33 |
| Copolymer (2) wt % | 47 | 48 | 67 |
| Copolymer (3) wt % | 20 | 9 | 0 |
| Fraction soluble in xylene wt % | 62 | 50.9 | 63 |
| Ratio between the fraction soluble in xylene of copolymer (2) and copolymer (1) | 1.2 | 0.94 | 1.91 |
| Total ethylene content wt % | 25.6 | 19.1 | — |
| Content of ethylene in the fraction soluble in xylene wt % | 32.7 | 26.8 | — |
| I.V. of fraction soluble in xylene dl/g | 2.77 | 3.71 | 3.2 |

TABLE 7

| Example | 4 | 5 | 1c |
|---|---|---|---|
| Melt flow rate (g/10 min) | 0.50 | 0.26 | 0.54 |
| Flexural modulus (MPa) | 100 | 194 | 110–115 |
| Izod at –40° C. (J/m) | 180 (80%) no breakage (20%) | 119 (75%) no breakage (25%) | 94–116 |
| Shore D hardness (points) | 29 | 40 | 35 |
| Film gloss (%) | 18.8 | 7.5 | 7.7 |
| Energy –50 (J) | 14.6 | 5.0 | 0.7 |

What is claimed is:

1. A process for the preparation of a heterophasic polyolefin composition comprising:
   i) polymerizing, in any given order,
      a) monomers selected from the group consisting of:
         (1) propylene, whereby a crystalline propylene polymer that is at least 80% by weight insoluble in xylene at ambient temperature is formed,
         (2) propylene and ethylene,
         (3) propylene and a $C_4$–$C_{10}$ α-olefin,
         (4) propylene, ethylene and a $C_4$–$C_{10}$ α-olefin, whereby a crystalline propylene copolymer containing more than 85% by weight of propylene is formed,
         (5) ethylene, whereby an ethylene homopolymer is formed, and
         (6) ethylene and a $C_3$–$C_{12}$ α-olefin, whereby an ethylene copolymer containing up to 20% by mole of the $C_3$–$C_{12}$ α-olefin is formed, and
      b) copolymerizing ethylene and a $C_3$–$C_{10}$ α-olefin, and, optionally, a diene, to form an elastomeric copolymer partially soluble in xylene at ambient temperature, containing up to 70% by weight of ethylene in the fraction soluble in xylene at ambient temperature,
   wherein the polymerizations are carried out in the presence of a Ziegler-Natta catalyst (1) obtained by contacting the following components:
      (a) a catalytic component containing a titanium compound and an electron-donor compound, both supported on Mg chloride;

(b) an organometallic compound, and, optionally,
(c) an electron-donor compound;

ii) contacting the polymer obtained in (i), in any given sequence, with:
   a) a compound capable of deactivating the catalyst present in (i); and
   b) a catalyst (2) obtained by contacting:
      (I) a compound containing a transition metal M, and at least one ligand coordinated with metal M by a π bond, and
      (II) at least one cocatalyst; and iii) copolymerizing ethylene and a $C_3$–$C_{10}$ α-olefin in the presence of the polymer treated as in (ii), and the catalyst (2).

2. The process of claim 1 where the molar ratio of ethylene to the total quantity of the monomers fed in (iii) ranges from 0.5 to 0.7.

3. The process of claim 1 where the fraction of the elastomeric copolymer (1)(b) soluble in xylene contains up to 40% by weight of ethylene.

4. The process of claim 1 where the $C_3$–$C_{10}$ α-olefin is propylene or 1-butene.

5. A polymer composition obtained by the process of claim 1.

6. The polymer composition of claim 5 comprising, by weight:

1) 10–45% of a crystalline polymer fraction selected from the group consisting of (a) a propylene homopolymer with a solubility in xylene at ambient temperature greater than 80%, (b) a copolymer of propylene and ethylene, (c) a copolymer of propylene and a $C_4$–$C_{10}$ α-olefin, (d) mixtures of (b) and (c), whereby the copolymers (b) and (c) contain more than 85% propylene and have an insolubility in xylene at ambient temperature of greater than 80%, (e) a homopolymer of ethylene, and (f) a copolymer of ethylene and a $C_3$–$C_{12}$ α-olefin, said copolymer containing up to 20% by mole of the $C_3$–$C_{12}$ α-olefin;

2) from 16 to 55% of a fraction partially soluble in xylene at ambient temperature, comprising copolymers of ethylene and a $C_3$–$C_{10}$ α-olefin; said fraction comprising an elastomeric copolymer of ethylene and a $C_3$–$C_{10}$ α-olefin, and, optionally, minor quantities of a diene, soluble in xylene at ambient temperature, and from 1 to 15%, with respect to the sum of said fractions (1) and (2), of a crystalline copolymer of ethylene and a $C_3$–$C_{10}$ α-olefin insoluble in xylene at ambient temperature, wherein said elastomeric copolymer contains up to 40% ethylene; and 3) 15–60% of an elastomeric copolymer selected from copolymers of ethylene and a $C_3$–$C_{10}$ α-olefin with a mole content of ethylene ranging from 30 to 75%, wherein said copolymer has an Mw/Mn ratio lower than 4;

wherein said polymer compositions have a ratio of the quantity of said fraction soluble in xylene at ambient temperature of copolymer fraction (2) to the quantity of polymer fraction (1) equal to or less than 1.5.

7. The composition of claim 6 where the elastomeric copolymer (3) has an intrinsic viscosity of greater than 1.5 dl/g.

8. An article comprising the composition of claim 6.

* * * * *